United States Patent
Izuka

(10) Patent No.: US 7,539,096 B2
(45) Date of Patent: May 26, 2009

(54) DISC PLAYBACK APPARATUS AND METHOD

(75) Inventor: Takashi Izuka, Kanagawa (JP)

(73) Assignee: Sony Corporation (JP)

( * ) Notice: Subject to any disclaimer, the term of this patent is extended or adjusted under 35 U.S.C. 154(b) by 679 days.

(21) Appl. No.: 11/230,631

(22) Filed: Sep. 21, 2005

(65) Prior Publication Data

US 2006/0077826 A1    Apr. 13, 2006

(30) Foreign Application Priority Data

Sep. 27, 2004  (JP) ............................. 2004-278818

(51) Int. Cl.
*G11B 20/00* (2006.01)
(52) U.S. Cl. ................. 369/47.17; 369/47.14
(58) Field of Classification Search ........................ None
See application file for complete search history.

(56) References Cited

U.S. PATENT DOCUMENTS 5,055,938 A * 10/1991 Misumi et al. .............. 386/113

FOREIGN PATENT DOCUMENTS

JP    2001-014680    1/2001
JP    2001-345676    12/2001

\* cited by examiner

*Primary Examiner*—Wayne R Young
*Assistant Examiner*—Adam R Giesy
(74) *Attorney, Agent, or Firm*—Rader Fishman & Grauer PLLC; Ronald P. Kananen

(57) ABSTRACT

A disc playback apparatus is configured to reproduce information by demodulating and decoding a radio-frequency signal obtained by receiving reflected light of a beam applied to a recording surface of a removable disc when the disc is loaded in the disc playback apparatus. The apparatus includes a disc format determining unit adapted to determine the format of the loaded disc, a high-frequency compensation unit adapted to compensate for a high-frequency component of the radio-frequency signal, a low-frequency compensation unit adapted to compensate for a low-frequency component of the radio-frequency signal, and a control unit adapted to determine which of the high-frequency compensation unit or the low-frequency compensation unit is to be used to compensate for a frequency characteristic of the radio-frequency signal based on the determined disc format.

8 Claims, 12 Drawing Sheets

FIG. 4
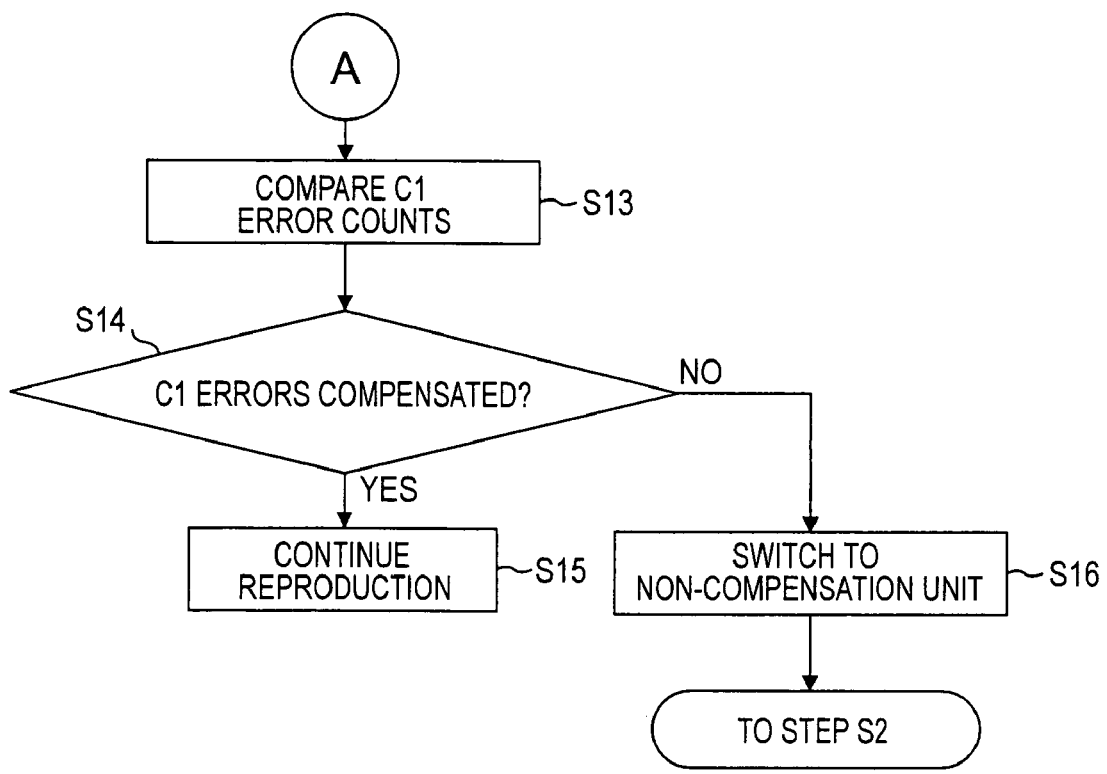
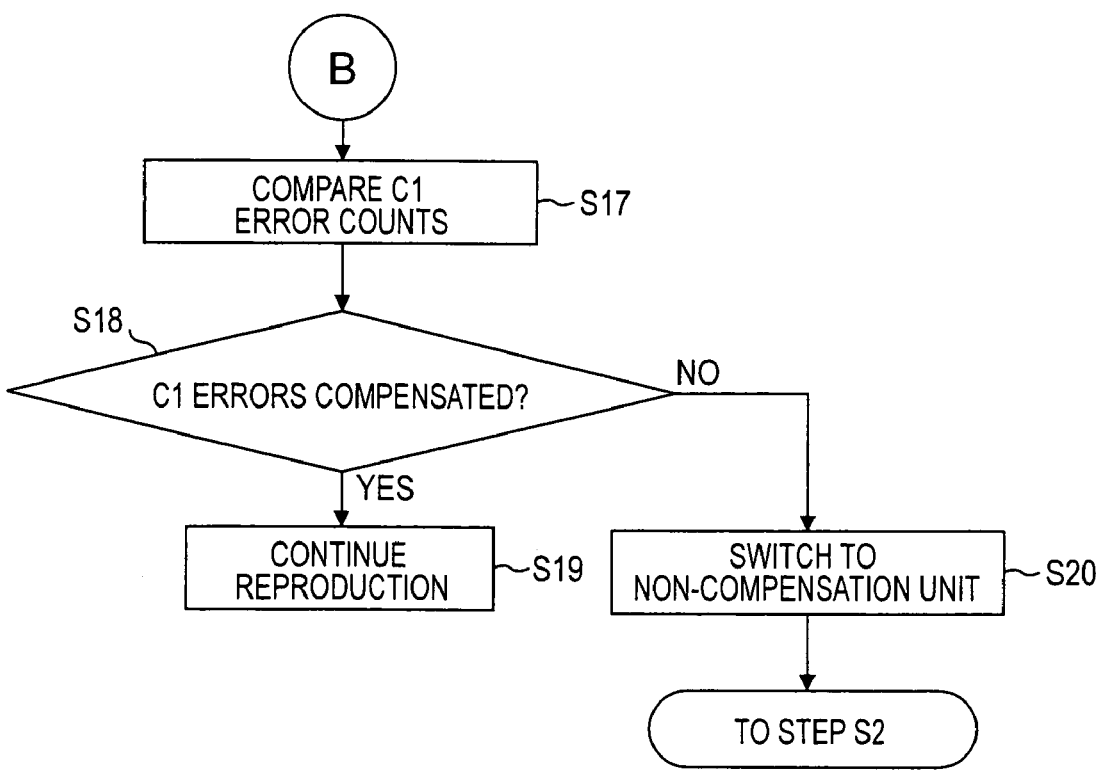

DISC PLAYBACK APPARATUS AND METHOD

CROSS REFERENCES TO RELATED APPLICATIONS

The present invention contains subject matter related to Japanese Patent Application JP 2004-278818 filed in the Japanese Patent Office on Sep. 27, 2004, the entire contents of which are incorporated herein by reference.

BACKGROUND OF THE INVENTION

1. Field of the Invention

The present invention relates to a disc playback apparatus and method for reproducing information recorded on a disc-shaped recording medium, and, particularly, to a disc playback apparatus, e.g., a compact disc (CD) drive, and method for reproducing information based on a radio-frequency (RF) signal obtained by receiving reflected light of a light beam applied to a recording surface of a recording medium.

More specifically, the present invention relates to a disc playback apparatus and method for reproducing information from a recording surface of removable discs of different types that are removably loaded in the disc playback apparatus, such as a CD-recordable (CD-R) disc and a CD-rewritable (CD-RW) disc. In particular, the present invention relates to a disc playback apparatus and method for reproducing information without errors even if the type of disc loaded in the disc playback apparatus changes.

2. Description of the Related Art

With the recent technological innovations, various types of calculation systems have been developed and become commercially available. In general, calculation systems include an external storage system for storing necessary information or installing an operating program.

One typical storage device is a magnetic recording hard disk drive. Several magnetic media are accommodated as recording media in the drive unit, and each medium is rotated at a high rate by a spindle motor. Each medium is coated with a magnetic material that is plated with nickel phosphorous or the like. Scanning of a magnetic head on a surface of a rotating medium along the radius of the rotating medium causes magnetization on the medium to write or read data.

The use of hard disks has already become widespread. For example, hard disks are used as standard external storage devices for personal computers, and are used for installing various software programs, such as operating system (OS) programs necessary for booting the computers and utility application programs, or storing created or edited files.

Another type of external storage device is configured such that a removable recording disc for transferring an operation program to be installed on a hard disk or data content among a plurality of systems is removably loaded into the device to reproduce information. In the past, portable media, such as flexible discs, were the mainstream. Recently, with the increasing size of programs and data content, disc-shaped recording media with a relatively large capacity, such as CDs, and apparatuses for playing back such discs have increasingly become popular.

A CD is a recording medium from which information can be reproduced based on an RF signal obtained by receiving reflected light of a light beam applied to a recording surface of the disc. Recently, not only read-only CDs ("press CDs") in which information is recorded as pits by manufacturers, such as compact disc read-only memory (CD-ROM) discs, but also discs on which information is recordable by end users, such as CD-R and CD-RW discs, have become available, and drives compatible with such user-recordable discs have increasingly become popular.

There are a variety of CDs depending on the combination of the reflective layer and the dye of the recording layer (see, for example, Yasuhiro MORI, "CD-R/DVD-R Masuta (CD-R/DVD-R Master)", Sansai Mook, pages 90 to 92, Jun. 1, 2002). For example, a CD-R disc is composed of a substrate, an organic dye layer, a recording layer, a reflective layer, an overcoat layer, and a protective layer. The recording layer is formed with dyes, e.g., cyanine blue dye, phthalocyanine dye, or azo dye, depending on the disc manufacturer. The reflective layer is one of two colors, either gold or silver. Data is written on a CD-R disc by creating pits with a semiconductor laser beam with a wavelength of 780 nanometers. Specifically, the dye decomposes with heat of the laser beam, and the substrate of polycarbonate is exposed to heat and is grooved to produce pits. Once data has been recorded, the recorded data is not erasable. A press CD has a similar structure to a CD-R disc, but has no dye layer because the reflective layer is directly deposited by aluminum evaporation on a polycarbonate substrate that is preformed with lands and grooves.

A CD-RW disc is composed of a substrate, a reflective layer, a lower protective layer, a phase-change recording layer, a reflective layer, an upper protective layer, an ultraviolet (UV) coating layer, and a printing surface. The phase-change recording layer is rapidly heated with the energy delivered by a laser beam, and is then rapidly cooled to produce amorphous areas, thereby forming pits. These pits reflect less light than the remaining crystalline areas. Erasing is performed by rapidly heating the recording layer with the energy delivered by the laser beam, which is of a temperature between those for recording and playback, and, then, slowly cooling it to return the amorphous state back to the crystalline state.

As discussed previously, a recording surface of such CDs is irradiated with a laser beam, and the light reflected from the recording surface is received to produce an RF signal, based on which information is reproduced. When the RF signal is not reproduced under good conditions, it is difficult to perform high-quality digital signal processing.

A CD player designed for music reproduction or a CD-ROM player designed for computer-data reproduction is not acceptable as a system when data errors occur in excess of a predetermined amount. Data errors are correctable by a signal processing circuit or the like. However, if the RF signal reproduced from a disc does not have sufficiently high quality, errors are not fully corrected for by the correction ability of the signal processing circuit, and data errors occur.

When a disc of the CD or CD-ROM format is played back, errors may not be fully corrected for due to low quality of the RF reproduction signal waveform (the eye pattern for 3T to 11T), and the reproduced sound may be contaminated with noise or data errors may occur. It is therefore necessary to perform frequency correction depending on the reproduced RF signal to facilitate digital signal processing.

In order to improve the quality of an RF reproduction signal of a disc of the CD or CD-ROM format, high-frequency compensation is generally performed on the RF reproduction signal. An RF high-frequency-compensation equalizer circuit or the like is typically used as a compensator at the stage before performing signal processing on a low-quality RF reproduction signal that is produced by a combination of the disc and an optical pickup, etc.

There has been proposed, for example, an optical disc device including an equalizer for changing a gain-frequency characteristic of an RF signal depending on the received light level of the light reflected from a disc that is irradiated with a laser beam, in which the characteristic of the equalizer is changed depending on the received light level, thereby reproducing information without errors irrespective of the disc type (see, for example, Japanese Unexamined Patent Application Publication No. 2001-14680, FIG. 2). This optical disc device controls the rise characteristic of the RF signal so as to be constant by increasing the gain in the high-frequency band when the received light level is low and by decreasing the high-frequency gain when the received light level is high.

However, due to the different natures from one CD format to another, the frequency band in which the RF reproduction signal waveform is degraded also differs. The received light level of the reflected light, i.e., the reproduced RF signal, differs depending on the disc type. Nevertheless, it is necessary to ensure the compatibility of the disc playback apparatus with each format of disc.

In high-frequency compensation, the frequency and the amount of compensation may be set to one fixed value or may be set to a plurality of or continuously variable values. In either case, high-frequency compensation is mostly effective for press CDs or CD-R discs susceptible to level degradation of a high-frequency signal of, e.g., 3T to 4T.

On the other hand, high-frequency compensation may often be disadvantageous for CD-RW discs (of the recordable erasable type) susceptible to level degradation of a low-frequency signal of, e.g., 10T to 11T. It is therefore difficult to improve the quality of an RF reproduction signal of a CD-RW disc using only an RF equalizer of the related art designed only for high-frequency compensation.

Accordingly, a high-frequency compensation circuit of the related art may be effective for press CDs or CD-R discs, but may often be ineffective for recordable erasable CD-RW discs.

SUMMARY OF THE INVENTION

It is therefore desirable to provide a high-performance disc playback apparatus, e.g., a CD drive, and method for suitably reproducing information based on an RF signal obtained by receiving reflected light of a light beam applied to a recording surface of a recording medium.

It is also desirable to provide a high-performance disc playback apparatus and method for suitably reproducing information from a recording surface of removable discs of different types that are removably loaded in the disc playback apparatus, such as a CD-R disc and a CD-RW disc.

It is further desirable to provide a high-performance disc playback apparatus and method for reproducing information without errors even if the type of the disc loaded in the disc playback apparatus changes.

It is still further desirable to provide a high-performance disc playback apparatus and method for reproducing information without errors by performing appropriate frequency compensation to improve the quality of the RF reproduction signal even if the type of the disc loaded in the disc playback apparatus changes.

A disc playback apparatus according to an embodiment of the present invention reproduces information by demodulating and decoding a radio-frequency signal obtained by receiving reflected light of a beam applied to a recording surface of a removable disc when the removable disc is loaded in the disc playback apparatus. The disc playback apparatus includes disc format determining means for determining the format of the loaded disc, a high-frequency compensation unit adapted to compensate for a high-frequency component of the radio-frequency signal, a low-frequency compensation unit adapted to compensate for a low-frequency component of the radio-frequency signal, and a control unit adapted to determine which of the high-frequency compensation unit or the low-frequency compensation unit is to be used to compensate for a frequency characteristic of the radio-frequency signal based on the determined disc format.

The disc format determining means may determine the format of the disc based on, for example, but not limited to, an intensity of the reflected light from the recording surface of the loaded disc.

According to an embodiment of the present invention, the disc playback apparatus is compatible with discs of multiple CD formats. The control unit may determine that the high-frequency compensation unit is to be used to compensate for the frequency characteristic of the radio-frequency signal when a read only memory compact disc (e.g., a press CD) or a recordable compact disc (e.g., a CD-R disc) is loaded in the disc playback apparatus, and may determine that the low-frequency compensation unit is to be used to compensate for the frequency characteristic of the radio-frequency signal when a recordable erasable compact disc (e.g., a CD-RW disc) is loaded in the disc playback apparatus.

According to an embodiment of the present invention, the disc playback apparatus may further include signal quality determining means for determining whether or not the quality of the radio-frequency signal is degraded. For example, the signal quality determining means may count the number of C1 errors in the demodulated and decoded radio-frequency signal, and may determine the quality of the radio-frequency signal based on the counted C1 errors. In this case, the control unit may compensate for the frequency characteristic of the radio-frequency signal using the high-frequency compensation unit or the low-frequency compensation unit in response to a degradation in the quality of the radio-frequency signal that is determined by the signal quality determining means. The C1 error count is also referred to as a "block error rate (BLER)," and is represented as the number of errors corrected in 7350 blocks into which data for one second is divided, which is expressed in count per second (cps).

An embodiment of the present invention pertains to a disc playback apparatus for reproducing information based on an RF signal obtained by receiving reflected light of a laser beam applied to a recording surface of a disc. It is difficult for such a disc playback apparatus to perform high-quality digital processing if the RF signal is not reproduced under good conditions. It is therefore necessary to perform frequency correction depending on the reproduced RF signal to facilitate digital signal processing.

In order to improve the quality of an RF reproduction signal of a disc of the CD or CD-ROM format, high-frequency compensation is generally performed on the RF reproduction signal. In high-frequency compensation, the frequency and the amount of compensation may be set to one fixed value or may be set to a plurality of or continuously variable values. However, a problem arises in that the received light level of the reflected light, i.e., the reproduced RF signal, differs from one format to another and the frequency band in which the RF reproduction waveform is degraded differs.

High-frequency compensation is effective for press CDs or CD-R discs susceptible to level degradation of a high-frequency signal of, e.g., 3T to 4T, but may often be disadvantageous for CD-RW discs (of the recordable erasable type) susceptible to level degradation of a low-frequency signal of, e.g., 10T to 11T. It is therefore difficult to improve the quality of the RF reproduction signal of a CD-RW disc using only an RF equalizer designed only for high-frequency compensation.

According to an embodiment of the present invention, therefore, in order to support insufficient quality of the RF reproduction signal, it is determined whether the disc is a press CD or a CD-R disc, or a CD-RW disc before actually transmitting a reproduction signal. If the disc is a press CD or a CD-R disc, high-frequency compensation is performed; if the disc is a CD-RW disc, low-frequency compensation is performed, thereby improving the reproduction quality of the RF signal.

When the high-frequency signal of the PF reproduction waveform is degraded due to bad recording conditions of a CD-R disc, environmental reasons, etc., high-frequency compensation for increasing the high-frequency component of the RF waveform compared to the low-frequency component is performed, thereby achieving an improvement without errors.

When the low-frequency signal of the RF reproduction waveform is degraded due to bad recording conditions of a CD-RW disc, environmental reasons, etc., low-frequency compensation for increasing the low-frequency component compared to the high-frequency component greatly improves the signal errors.

A conceivable mechanism for implementing the compensation function depending on the format of the medium is an automatic correction mechanism for determining the C1 error count value, the RF jitter value, or the like and performing the compensation function in excess of a predetermined reference value to implement the compensation function.

According to an embodiment of the present invention, a high-performance disc playback apparatus and method for suitably reproducing information from a recording surface of removable discs of different types that are removably loaded in the disc playback apparatus, such as a CD-R disc and a CD-RW disc, can be achieved.

According to another embodiment of the present invention, a high-performance disc playback apparatus and method for reproducing information without errors even if the type of the disc loaded in the disc playback apparatus changes can be achieved.

According to another embodiment of the present invention, a high-performance disc playback apparatus and method for reproducing information without errors by performing appropriate frequency compensation to improve the quality of the RF reproduction signal even if the type of the disc loaded in the disc playback apparatus changes can be achieved.

A disk playback apparatus according to an embodiment of the present invention performs high-frequency compensation when the loaded disc is a press CD or a CD-R disc susceptible to level degradation of a high-frequency signal, and performs low-frequency compensation when the loaded disc is a CD-RW disc (of the recordable erasable type) susceptible to level degradation of a low-frequency signal, thereby improving the quality of the RF reproduction signal. The occurrence of noise for music reproduction and the occurrence of data errors for data reproduction are therefore prevented. If the quality of the RF reproduction signal is low, compensation is performed depending on the media format, thereby achieving high-quality reproduction.

Further objects, features, and advantages of the present invention will become apparent from the following detailed description of an embodiment of the present invention, taken in conjunction with the accompanying drawings.

BRIEF DESCRIPTION OF THE DRAWINGS

FIG. 4 is a flowchart showing the data reproducing process performed by the disc playback apparatus;

DESCRIPTION OF THE PREFERRED EMBODIMENTS

An embodiment of the present invention will be described in detail with reference to the drawings.

Figure 1:
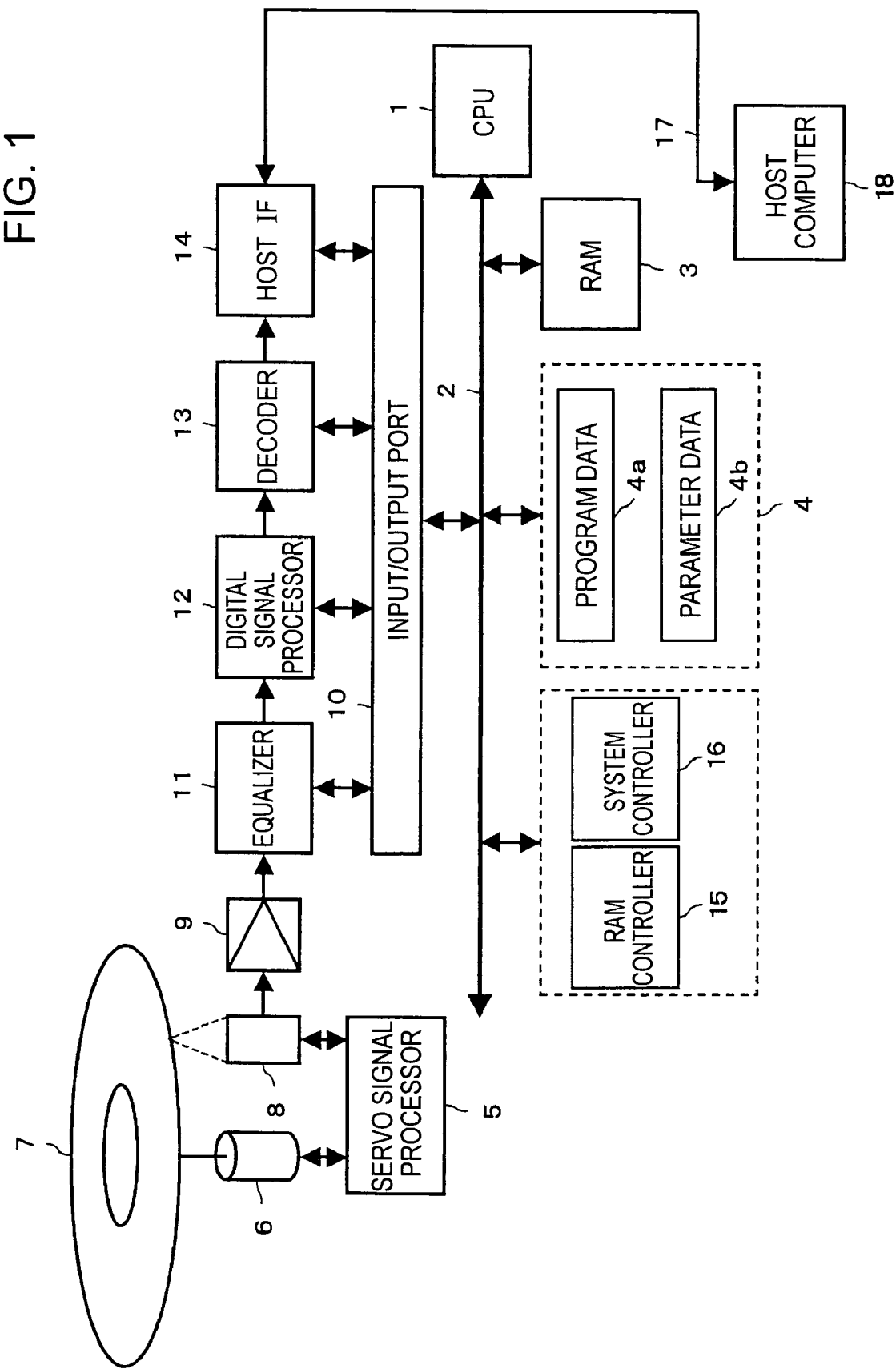
FIG. 1 is a schematic block diagram of the hardware configuration of a disc playback apparatus according to an embodiment of the present invention.

FIG. 1 schematically shows the hardware configuration of a disc playback apparatus according to an embodiment of the present invention.

The disc playback apparatus shown in FIG. 1 is capable of reading data from discs of multiple CD formats, such as CD-ROM (press CD), CD-R, and CD-RW discs, based on a change in the intensity of the light reflected from a pattern of pitted and unpitted areas on a recording surface of the discs that is irradiated with a laser beam. Such optical discs are specified so as to have a minimum data length (minimum pit length) of 3T and a maximum data length (maximum pit length) of 11T, and record data that is modulated using EFM (Eight to Fourteen Modulation) that belongs to the class of DC-free codes.

In the disc playback apparatus, a central processing unit (CPU) 1 is connected to a bus 2, and the bus 2 is also connected to a random access memory (RAM) 3 serving as a work memory, a read-only memory (ROM) 4 serving as a non-volatile memory storing program data 4*a* for system control and parameter data 4*b* for control, a servo signal processing circuit 5, a spindle motor 6 for rotating an optical disc 7 via the servo signal processing circuit 5, and an optical pickup 8. An equalizer 11, a digital signal processing circuit 12, a decoder 13, and a host interface circuit 14 communicating with a host computer 18 are further connected via an input/output port 10. The equalizer 11 equalizes the waveform of an RF signal from an amplification circuit 9, and the digital signal processing circuit 12 binarizes the output of the equalizer 11, and then generates a clock. The digital signal processing circuit 12 reproduces data based on the generated clock, and performs error correction on the reproduced data. The decoder 13 performs processing, such as error correction, on the output of the digital signal processing circuit 12, and decodes the data into the original data sequence.

The host interface circuit 14 complies with the interface standard, such as USB (Universal Serial Bus) or SCSI (Small Computer System Interface). The disc playback apparatus is connected to a host system, such as a personal computer, via the host interface circuit 14 and an external bus 17.

The servo signal processing circuit 5 synchronously controls the spindle motor 6 to rotate and the optical pickup 8 to scan in the radial direction of the disc, and carries out the focusing and tracking operations.

When the disc playback apparatus is powered on, the program data 4*a* stored in the ROM 4 is loaded into a main memory of the CPU 1, and the CPU 1 therefore functions as a RAM controller 15 and a system controller 16, as indicated by a broken-line block in FIG. 1.

The optical discs 7 compatible with the disc playback apparatus include CD-ROM, CD-R, and CD-RW discs. The disc playback apparatus is capable of normal-speed or x-time-speed playback in response to an instruction from the host computer 18.

The equalizer 11 is provided for the purpose of correcting for deterioration of the eye pattern based on a modulation transfer function (MTF). In playing back the optical disc 7, the impulse response waveform output from the optical pickup 8 has spreading tails with the eye pattern being flattened at the center due to the disc molding conditions, etc., thus preventing binarization with respect to the center of the eye pattern from being stably performed. For example, the equalizer 11 increases the level of the RF reproduction waveform in the high-frequency region, thereby allowing the digital signal processing circuit 12 to stably perform binarization and, equivalently, correcting for the MTF degradation. The details of the frequency-band compensation ability of the equalizer 11 are discussed below.

When the optical disc 7 is loaded in the disc playback apparatus, the spindle motor 6 starts rotating, and the optical disc 7 is rotated at a constant linear velocity. When the rotation speed of the optical disc 7 becomes constant, the optical pickup 8 irradiates a laser beam onto a recording surface of the optical disc 7 and reads the reflected light of the laser beam. The intensity of the reflected light changes depending on the pattern of pitted and unpitted areas on the recording surface, and data is therefore read from the optical disc 7.

A CD-ROM or CD-R disc onto which data is written by changing the dye color has a high reflectivity, and a CD-RW disc onto which data is written by phase change has a low reflectivity (a CD-R disc reflects about four times as much light as a CD-RW disc). The disc reflectivity detected by the optical pickup 8 is sent to the CPU 1 via the servo signal processing circuit 5 and the bus 2, and the CD format is determined.

The data read by the optical pickup 8 is supplied as a reproduced RF signal to the digital signal processing circuit 12 via the amplification circuit 9 and the equalizer 11, and is then reproduced as digital data by the digital signal processing circuit 12. The reproduced digital data is supplied to the decoder 13, and is corrected for errors and converted into the original data sequence by the decoder 13.

Next, the operation of the equalizer 11 to compensate an RF reproduction waveform will be discussed.

A CD player designed for music reproduction or a CD-ROM player designed for computer-data reproduction is not acceptable as a system when data errors occur in excess of a predetermined amount.

A digital signal processing circuit or the like has a capability of correcting for data errors. However, if the RF signal reproduced from a disc does not have sufficiently high quality, errors are not corrected for even by the correction ability of the digital signal processing circuit, and data errors occur. It is therefore necessary to perform frequency correction depending on the reproduced RF signal to facilitate digital signal processing.

In order to improve the quality of an RF reproduction signal of a disc of the CD or CD-ROM format, high-frequency compensation is generally performed on the RF reproduction signal. However, a problem arises in that the received light level of the reflected light, i.e., the reproduced RF signal, differs from one format to another and the frequency band in which the RF reproduction waveform is degraded differs.

High-frequency compensation is effective for press CDs or CD-R discs susceptible to level degradation of a high-frequency signal of, e.g., 3T to 4T, but may often be disadvantageous for CD-RW discs (of the recordable erasable type) susceptible to level degradation of a low-frequency signal of, e.g., 10T to 11T. It is therefore difficult to improve the quality of the RF reproduction signal of a CD-RW disc using only an RF equalizer designed only for high-frequency compensation.

According to the present embodiment, therefore, the equalizer 11 includes a high-frequency compensation circuit for compensating for degradation of the high-frequency component of the RF reproduction waveform, and a low-frequency compensation circuit for compensating for degradation of the low-frequency component. Degradation of the RF reproduction waveform is compensated for selectively using one of the compensation circuits depending on the format of the loaded disc. Specifically, in order to support insufficient quality of the RF reproduction signal, it is determined whether the disc is a press CD or a CD-R disc, or a CD-RW disc before actually transmitting a reproduction signal. If the disc is a press CD or a CD-R disc, high-frequency compensation is performed; if the disc is a CD-RW disc, low-frequency compensation is performed, thereby improving the reproduction quality of the RF signal.

Figure 2:
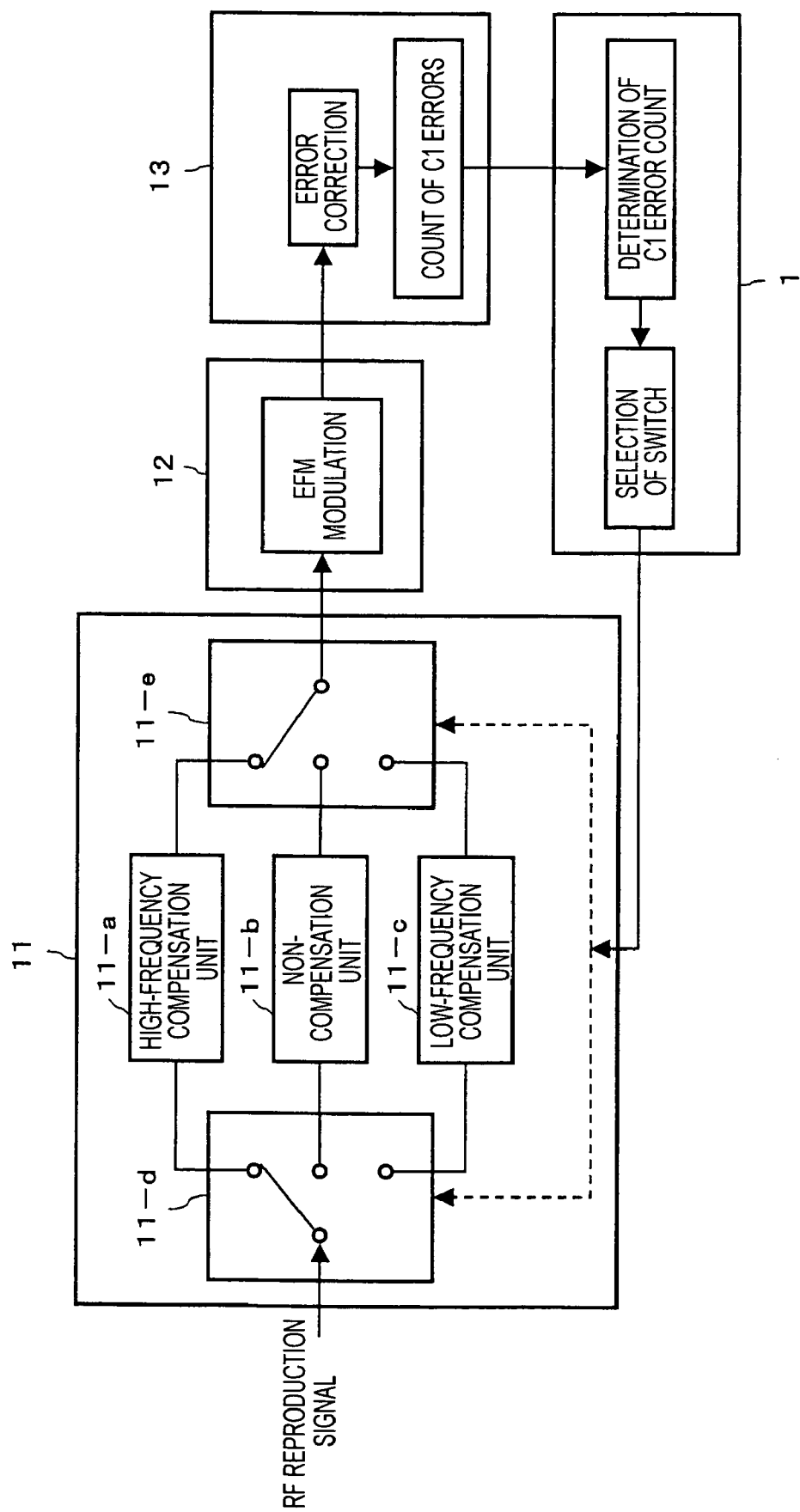
FIG. 2 is a schematic internal block diagram of an equalizer in the disc playback apparatus shown in FIG. 1.

FIG. 2 shows the internal structure of the equalizer 11 according to the present embodiment. As shown in FIG. 2, the equalizer 11 includes a high-frequency compensation unit 11-*a* adapted to perform high-frequency compensation on an RF signal read by the optical pickup 8, a non-compensation unit 11-*b* adapted to transmit the RF signal without performing compensation, a low-frequency compensation unit 11-*c* adapted to perform low-frequency compensation on the RF signal, and a pair of switches 11-*d* and 11-*e* adapted to selectively switch an input terminal from which the RF signal is input to the equalizer 11 and an output terminal through which the signal is output to the digital signal processor 12 from the equalizer 11 to any of the compensation units 11-a to 11-c.

In the initial state, the switches 11-d and 11-e connect the non-compensation unit 11-b to the input terminal and the output terminal. Switching of the switches 11-d and 11-e, that is, selection of the compensation units 11-a to 11-c, is performed by, for example, the CPU 1. The CPU 1 determines the quality of the RF reproduction signal based on the decoded data or the like. If degradation in the quality is found, the CPU 1 determines that it is necessary for the equalizer 11 to perform signal compensation.

The CPU 1 further determines the CD format based on the disc reflectivity that is detected by the optical pickup 8 or the like. A CD-ROM or CD-R disc onto which data is written by changing the dye color has a high reflectivity, and a CD-RW disc onto which data is written by phase change has a low reflectivity (a CD-R disc reflects about four times as much light as a CD-RW disc). Based on the disc reflectivity detected by the optical pickup 8, the CD format of the loaded disc is determined.

If the determined CD format is the press CD or CD-R format when it is determined that compensation for the RF reproduction signal is necessary, the CPU 1 changes the switches 11-d and 11-e to the high-frequency compensation unit 11-a to perform high-frequency compensation, thereby improving the reproduction quality of the RF signal. If the determined CD format is the CD-RW format when it is determined that compensation for the RF reproduction signal is necessary, the CPU 1 changes the switches 11-d and 11-e to the low-frequency compensation unit 11-c to perform low-frequency compensation, thereby improving the reproduction quality of the RF signal.

The digital signal processor 12 EFM-modulates the RF reproduction signal to reproduce digital data. The reproduced digital data is supplied to the decoder 13, and is corrected for errors and converted into the original data sequence by the decoder 13. After performing error correction, the number of C1 errors is counted. The C1 error count is also referred to as a "block error rate (BLER)," and is represented as the number of errors corrected in 7350 blocks into which data for one second is divided, which is expressed in count per second (cps). Based on the C1 error count, the CPU 1 determines the quality of the RF reproduction signal and the necessity of compensation for the RF signal.

Figure 3:
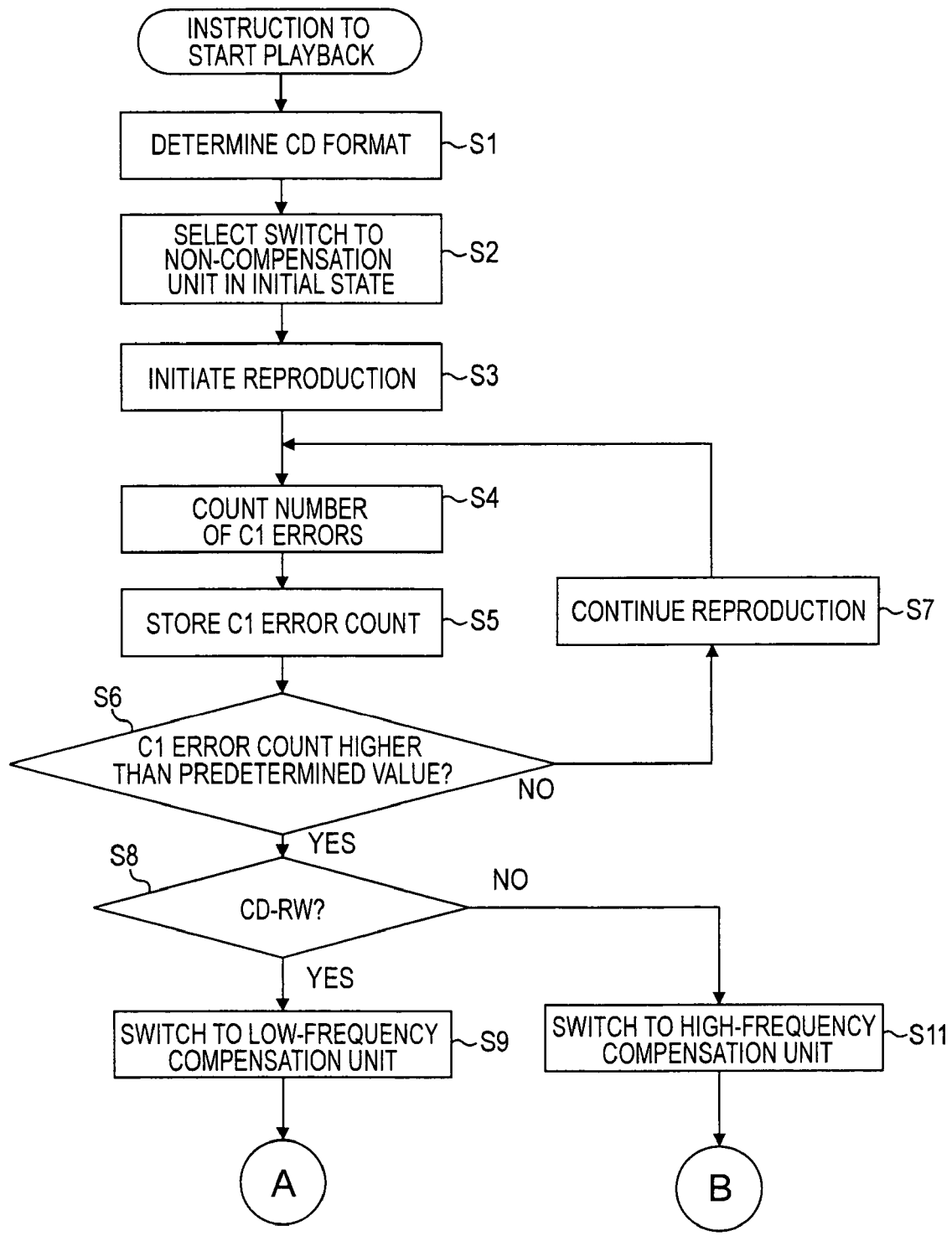
FIG. 3 is a flowchart showing a data reproducing process performed by the disc playback apparatus.

FIGS. 3 and 4 are flowcharts showing a routine for a data reproducing process performed by the disc playback apparatus according to the present embodiment. The data reproducing process will be discussed in the context of compensation for an RF reproduction signal.

This routine starts when a disc with a certain CD format is loaded into the disc playback apparatus and when a instruction to start disc playback is input from the host computer 18.

First, it is determined whether the CD format of the loaded disc is the press CD or CD-R format or the CD-RW format based on an intensity of the reflected light from a disc surface that is received by the optical pickup 8 (step S1).

In the initial state, the switches 11-d and 11-e in the equalizer 11 connect the non-compensation unit 11-b to the input terminal and the output terminal (step S2). The reproduction process is initiated in this state (step S3). The RF reproduction signal is EFM-modulated and is thus reproduced as digital data.

The reproduced digital data is supplied to the decoder 13, and is corrected for errors and converted into the original data sequence by the decoder 13. After performing error correction, the number of C1 errors is counted (step S4). The decoder 13 stores the error count value (step S5).

When the C1 error count is reported from the decoder 13, the CPU 1 determines whether or not the C1 error count is higher than a predetermined value (step S6). As long as the C1 error count is not higher than the predetermined value, the data reproduction process is continuously performed without correcting the RF reproduction signal by the equalizer 11 (step S7).

If the C1 error count is higher than the predetermined value in step S6, the CPU 1 checks the CD format of the currently loaded disc (step S8).

If the CD format of the disc is the CD-RW format, the CPU 1 changes the switches 11-d and 11-e to the low-frequency compensation unit 11-c to perform low-frequency compensation (step S9).

Then, the number of C1 errors counted in step S5 is compared with the number of C1 errors counted after performing low-frequency compensation (step S13). In step S14, it is determined whether or not the number of C1 errors is lower than the value counted before performing low-frequency compensation.

If the C1 errors are not corrected and the quality of the RF reproduction signal is not improved, the CPU 1 changes the switches 11-d and 11-e to the non-compensation unit 11-b (step S16). Then, the routine returns to step S2, and the reproduction process is continuously performed without compensation of the RF reproduction signal by the equalizer 11.

If the C1 errors are corrected and the quality of the RF reproduction signal is improved, the reproduction process is continuously performed while connecting the switches 11-d and 11-e to the low-frequency compensation unit 11-c and performing low-frequency compensation (step S15).

If the C1 error count is higher than the predetermined value (step S6) and the CD format is not the CD-RW format, i.e., the press CD or CD-R format (step S8), the CPU 1 changes the switches 11-d and 11-e to the high-frequency compensation unit 11-a to perform high-frequency compensation (step S11).

Then, the number of C1 errors counted in step S5 is compared with the number of C1 errors counted after performing high-frequency compensation (step S17). In step S18, it is determined whether or not the number of C1 errors is lower than the value counted before performing high-frequency compensation.

If the C1 errors are not corrected and the quality of the RF reproduction signal is not improved, the CPU 1 changes the switches 11-d and 11-e to the non-compensation unit 11-b (step S20). Then, the routine returns to step S2, and the reproduction process is continuously performed without compensation of the RF reproduction signal by the equalizer 11.

If the C1 errors are corrected and the quality of the RF reproduction signal is improved, the reproduction process is continuously performed while connecting the switches 11-d and 11-e to the high-frequency compensation unit 11-a and performing high-frequency compensation (step S19).

Therefore, a system for automatically performing the optimum compensation by determining the conditions of an RF signal reproduced from a disc at an appropriate time according to the above-described process routine can be achieved.

Figure 5:
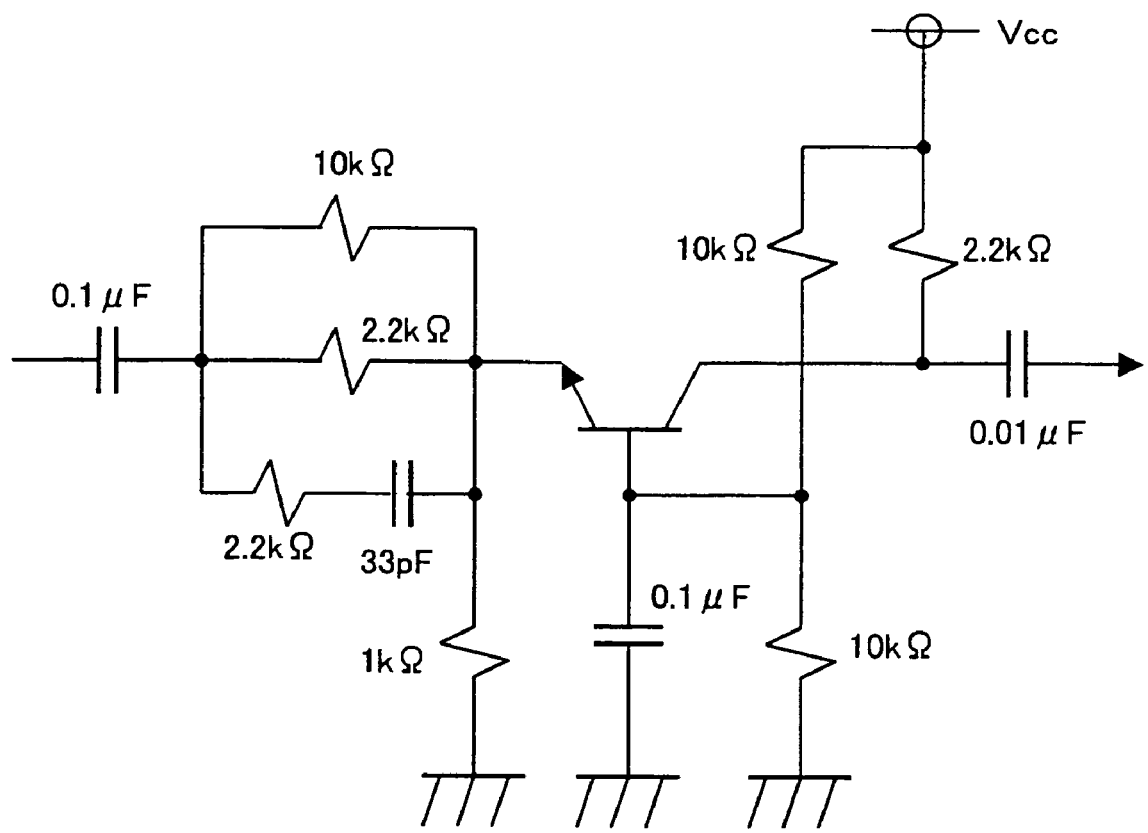
FIG. 5 is a circuit diagram of a high-frequency compensation unit in the equalizer.
Figure 6:
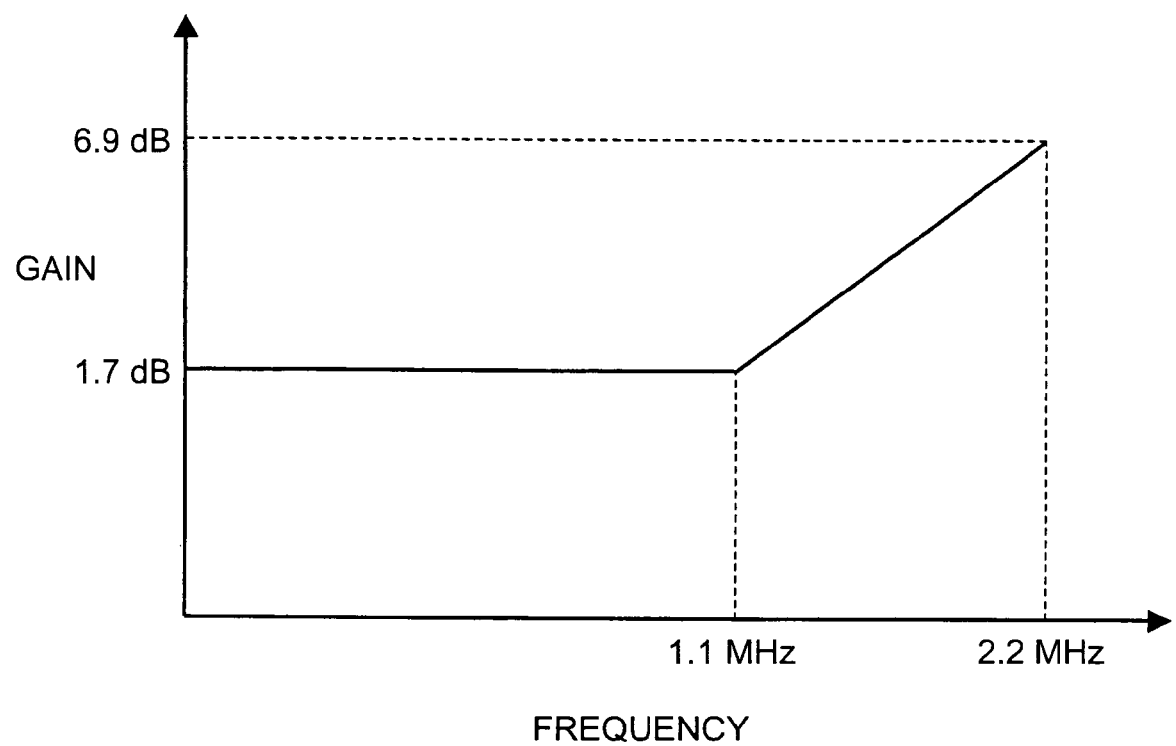
FIG. 6 is a gain-frequency characteristic chart of the high-frequency compensation unit shown in FIG. 5.

FIG. 5 shows an example circuit structure of the high-frequency compensation unit 11-a. In the example shown in FIG. 5, the high-frequency compensation unit 11-a is configured using a common-base amplifier. FIG. 6 shows the gain-frequency characteristic of the high-frequency compensation unit 11-*a*. As can be seen from FIG. 6, the gain in the high-frequency band, or the high-frequency gain, is higher than that in the low-frequency band. Thus, the level degradation of the high-frequency signal of, e.g., 3T to 4T, is compensated for.

Figure 7:
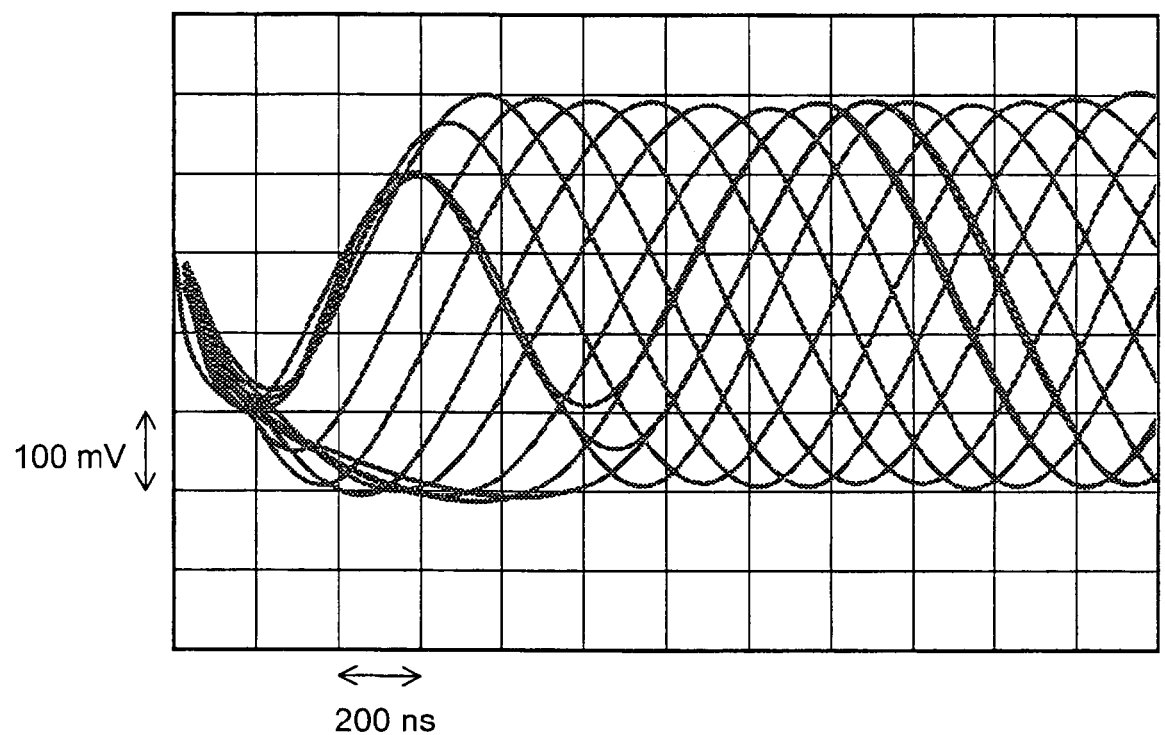
FIG. 7 is a diagram showing normal RF reproduction waveforms of a CD-R disc.
Figure 8:
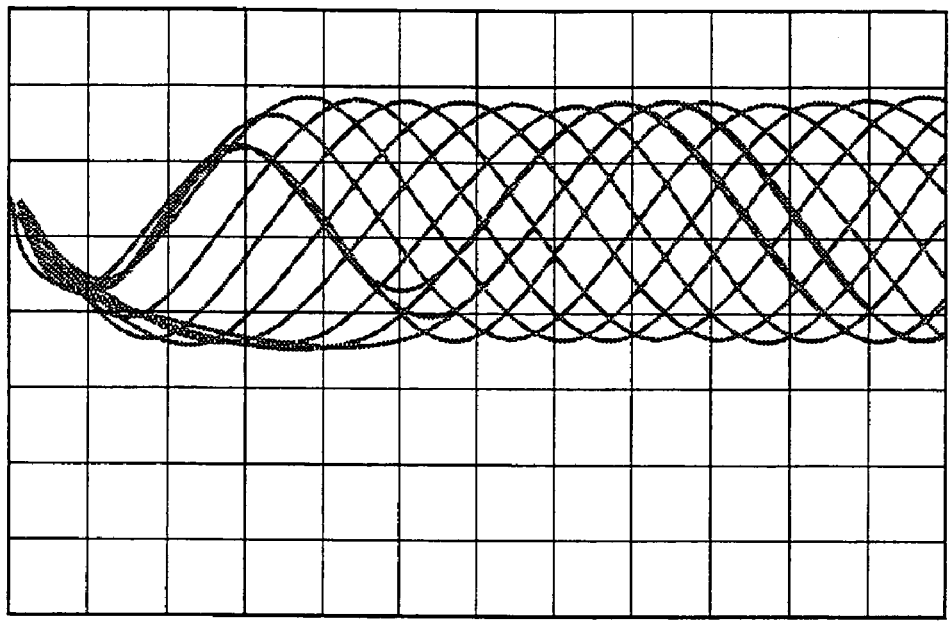
FIG. 8 is a diagram showing RF reproduction waveforms with the high-frequency signal degraded due to bad recording conditions of the CD-R disc, environmental reasons, etc.

FIG. 7 shows normal RF reproduction waveforms of a CD-R disc. In FIG. 7, one waveform corresponds to a signal retrieved per pit. Press CDs or CD-R discs are susceptible to level degradation of a high-frequency signal of, e.g., 3T to 4T. FIG. 8 shows RF reproduction waveforms with the high-frequency signal degraded due to bad recording conditions of the CD-R disc, environmental reasons, etc.

Figure 9:
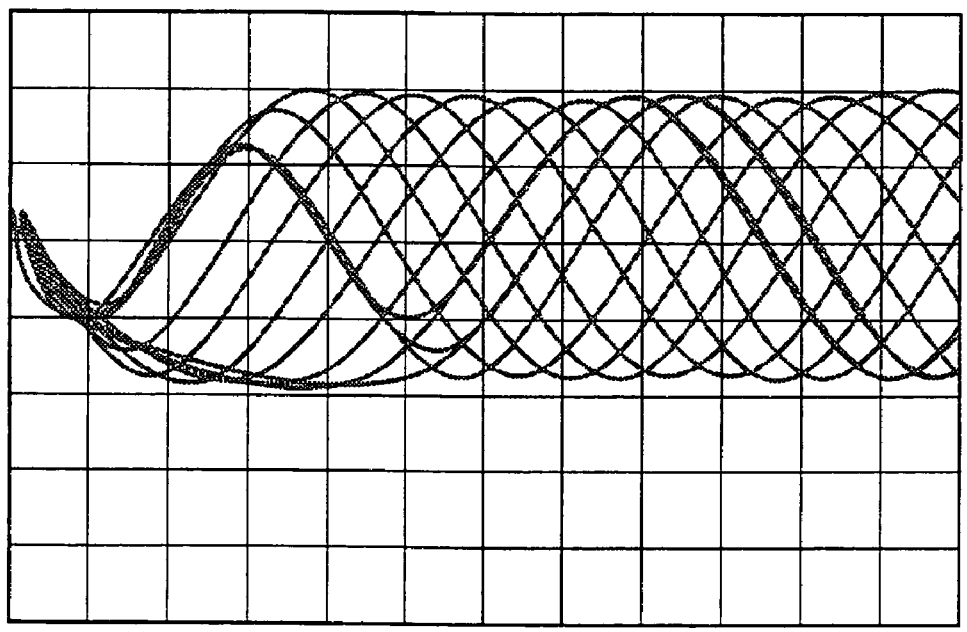
FIG. 9 is a diagram showing RF reproduction waveforms obtained by performing high-frequency compensation on the RF waveforms shown in FIG. 8 using the high-frequency compensation unit shown in FIG. 5.

FIG. 9 shows RF reproduction waveforms obtained by performing high-frequency compensation on the RF waveforms shown in FIG. 8 using the high-frequency compensation unit 11-*a* shown in FIG. 5. While the waveforms shown in FIG. 8 contain multiple errors during signal processing, the improved waveforms shown in FIG. 9 contain substantially no errors.

Figure 10:
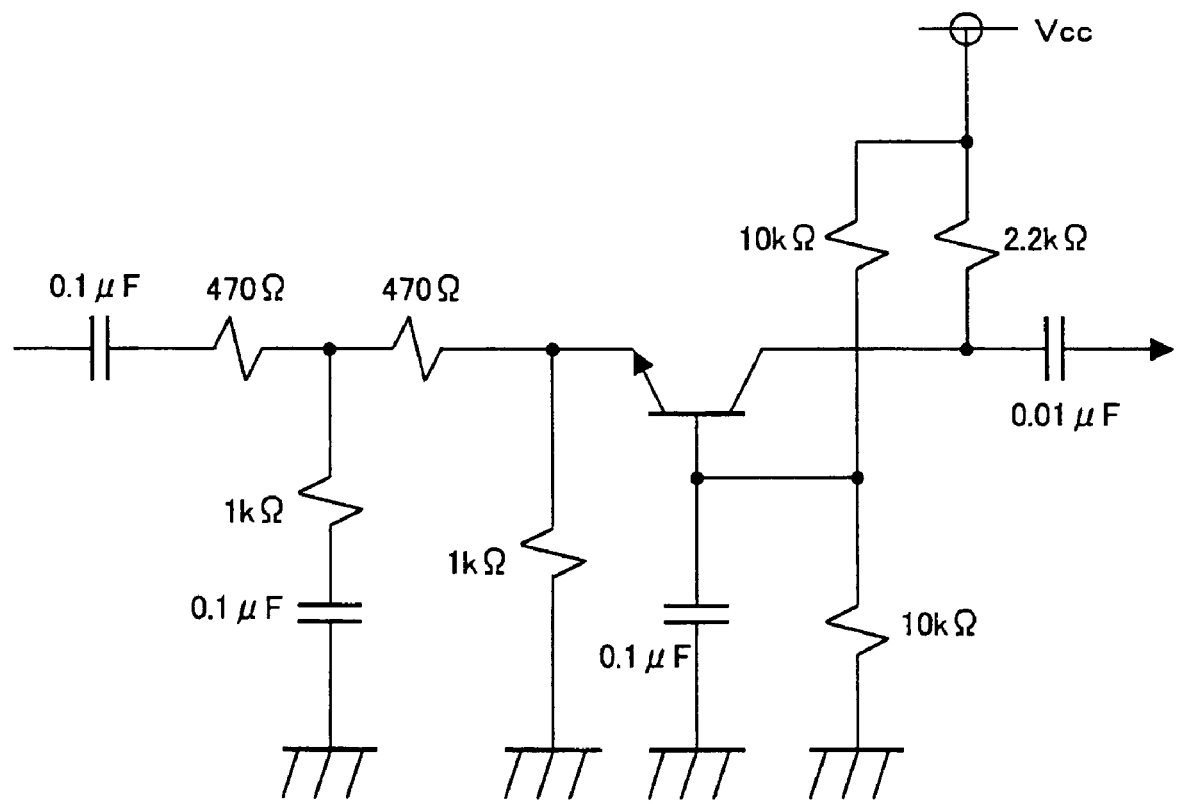
FIG. 10 is a circuit diagram of a low-frequency compensation unit in the equalizer.
Figure 11:
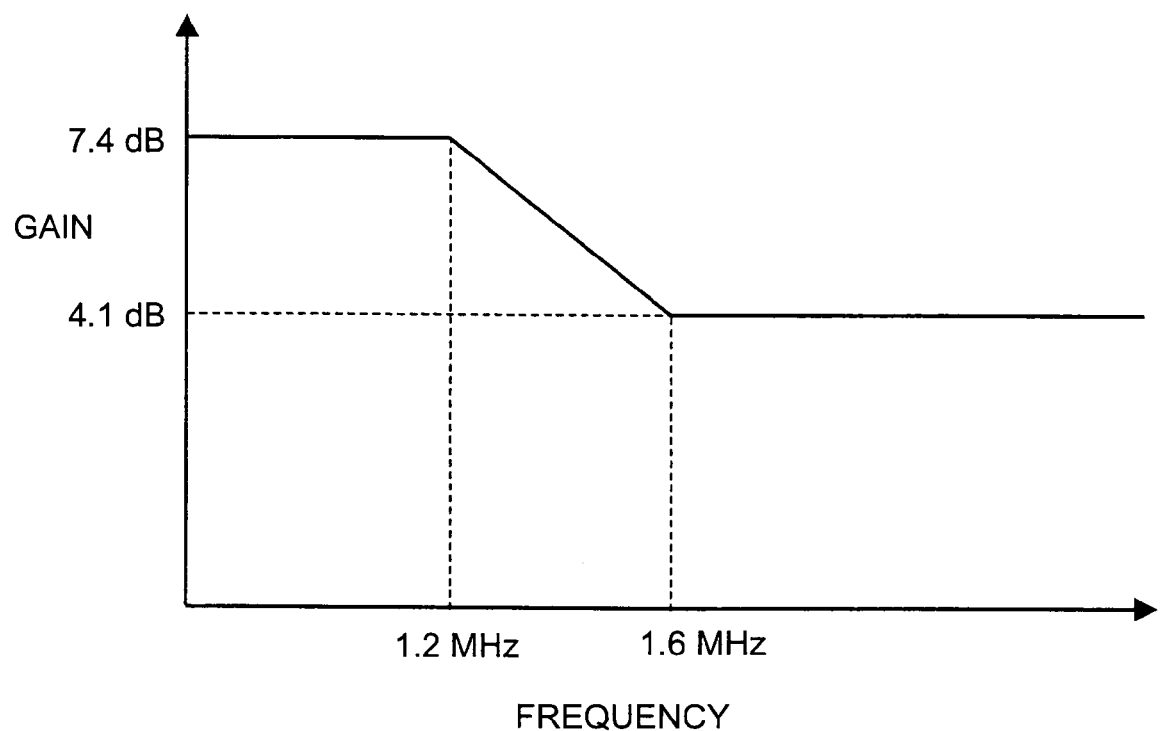
FIG. 11 is a gain-frequency characteristic chart of the low-frequency compensation unit shown in FIG. 10.

FIG. 10 shows an example circuit structure of the low-frequency compensation unit 11-*b*. In the example shown in FIG. 10, the low-frequency compensation unit 11-*c* is configured using a common-base amplifier. FIG. 11 shows the gain-frequency characteristic of the low-frequency compensation unit 11-*c*. As can be seen from FIG. 11, the gain in the low-frequency band, or the low-frequency gain, is higher than that in the high-frequency band. Thus, the level degradation of the low-frequency signal of, e.g., 10T to 11T, is compensated for.

Figure 12:
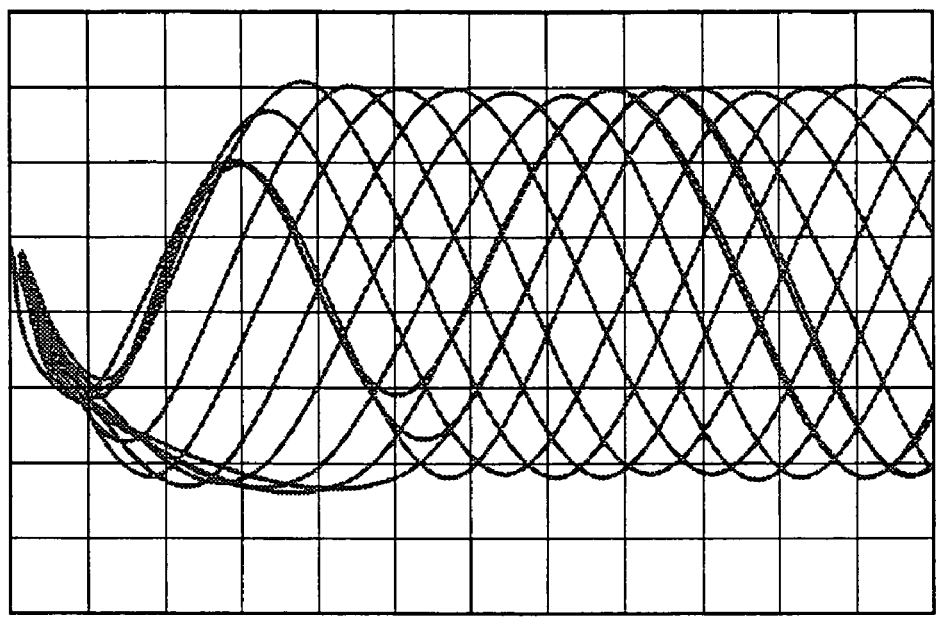
FIG. 12 is a diagram showing normal RF reproduction waveforms of a CD-RW disc.
Figure 13:
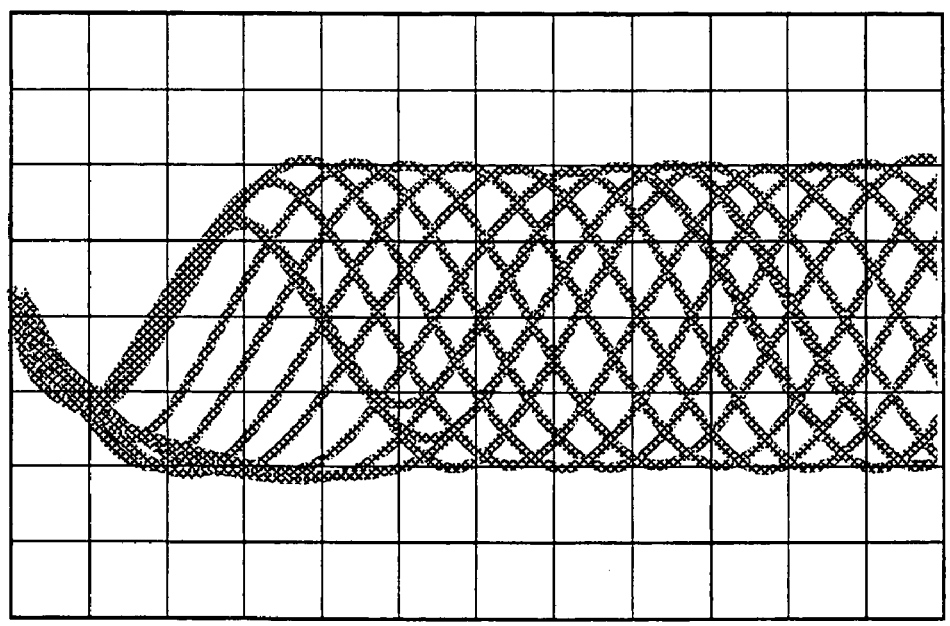
FIG. 13 is a diagram showing RF reproduction waveforms with the low-frequency signal degraded due to bad recording conditions of the CD-RW disc, environmental reasons, etc.

FIG. 12 shows normal RF reproduction waveforms of a CD-RW disc. In FIG. 12, one waveform corresponds to a signal retrieved per pit. A CD-RW disc is susceptible to level degradation of a low-frequency signal of, e.g., 10T to 11T. FIG. 13 shows RF reproduction waveforms with the low-frequency signal degraded due to bad recording conditions of the CD-RW disc, environmental reasons, etc.

Figure 14:
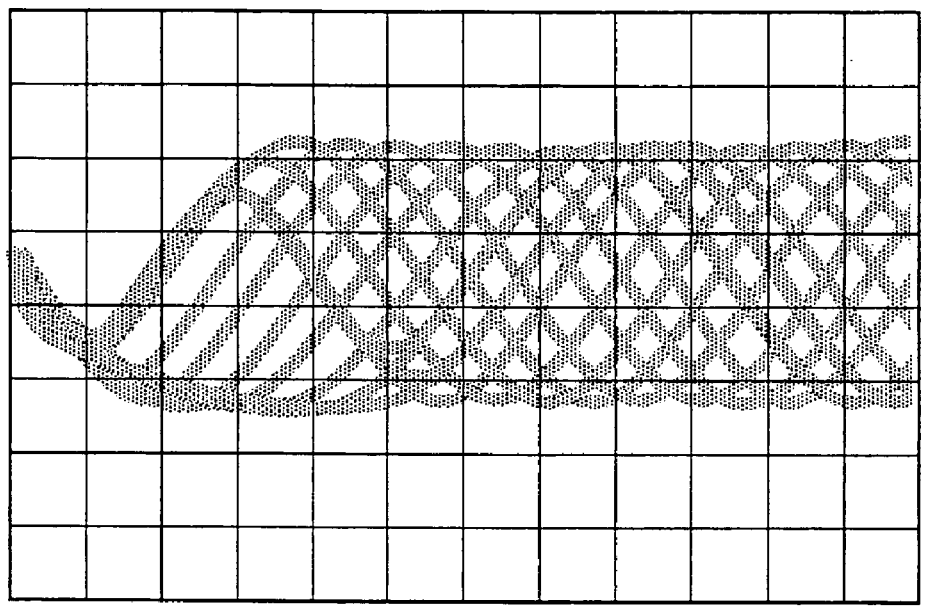
FIG. 14 is a diagram showing RF reproduction waveforms obtained by performing high-frequency compensation on the RF waveforms shown in FIG. 13 using the high-frequency compensation unit shown in FIG. 5.

FIG. 14 shows RF reproduction waveform obtained by performing high-frequency compensation on the RF waveforms shown in FIG. 13 using the high-frequency compensation unit 11-*a* shown in FIG. 5. As can be seen from FIG. 14, if high-frequency compensation is performed on an RF reproduction waveform with degradation in the low-frequency region, signal errors are not corrected but are further degraded.

Figure 15:
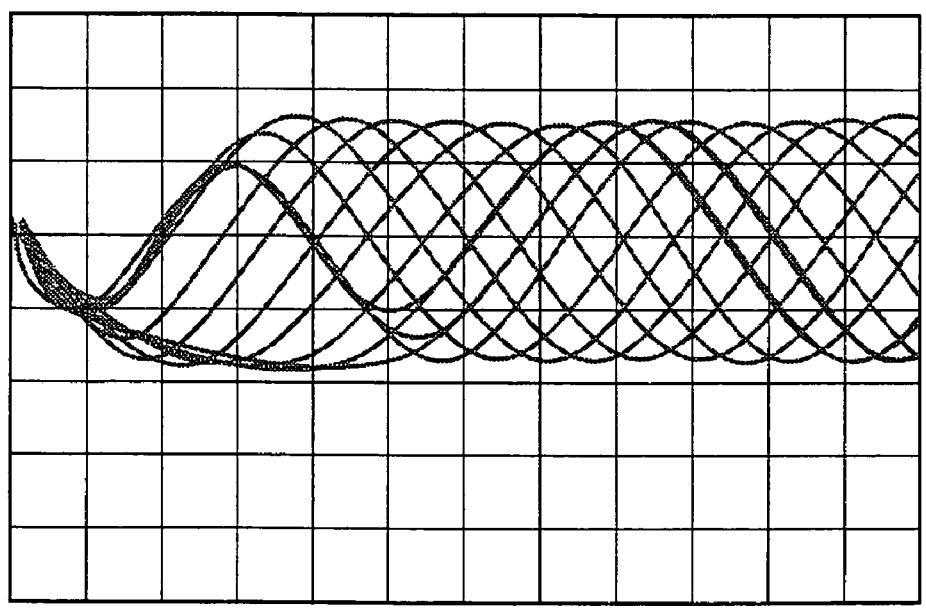
FIG. 15 is a diagram showing RF reproduction waveforms obtained by performing low-frequency compensation on the RF waveforms shown in FIG. 13 using the low-frequency compensation unit shown in FIG. 10.

FIG. 15 shows RF reproduction waveforms obtained by performing low-frequency compensation on the RF waveforms shown in FIG. 13 using the low-frequency compensation unit 11-*c* shown in FIG. 10. While the waveforms shown in FIG. 13 contain multiple errors during signal processing, the improved waveforms shown in FIG. 15 contains substantially no errors. Since CD-RW discs are not susceptible to degradation of a high-frequency signal unlike CD-R discs, it is effective for such CD-RW discs to perform compensation using the low-frequency compensation circuit shown in FIG. 10.

The high-frequency compensation circuit and the low-frequency compensation circuit are not limited to those shown in FIGS. 5 and 10, and multiple modification and variations are conceivable.

While a specific embodiment of the present invention has been described in detail, it is obvious that a variety of modifications or alternatives may be made to the specific embodiment by those skilled in the art without departing from the scope of the present invention.

An embodiment of the present invention has been described in the context of, as a digital removable medium, a CD that allows data to be recorded as high-density pits onto a resin disc and that allows the data to be read based on a change in the intensity of the reflected light from the surface state, such as a pattern of pitted and unpitted areas, on a recording surface of the CD that is irradiated with a laser beam. Although the RF reproduction waveform is degraded in different bands depending on the CD format, appropriate frequency-band compensation for the RF reproduction waveform depending on the format allows the quality of an RF reproduction signal to be improved for any medium type.

However, the present invention is not limited to this embodiment. For example, according to an embodiment of the present invention, a digital versatile disc (DVD) that is irradiated with a laser beam to retrieve data in a similar manner to CDs by detecting the reflected light of the laser beam on the disc surface also allows the quality of an RF reproduction signal to be improved for any medium type by implementing appropriate frequency-band compensation for the RF reproduction waveform depending on the format.

The present invention has been disclosed as an exemplary embodiment, and the disclosure should not be construed as the restrictive one. Reference should be made to the appended claims for delineation of the scope of the present invention.

It should be understood by those skilled in the art that various modifications, combinations, sub-combinations and alternatives may occur depending on design requirements and other factors insofar as they are within the scope of the appended claims or the equivalents thereof.

What is claimed is:

1. A disc playback apparatus for reproducing information by demodulating and decoding a radio-frequency signal obtained by receiving reflected light of a beam applied to a recording surface of a removable disc when the removable disc is loaded in the disc playback apparatus, the apparatus comprising:
   disc format determining means for determining the format of the loaded disc;
   a high-frequency compensation unit adapted to compensate for a high-frequency component of the radio-frequency signal;
   a low-frequency compensation unit adapted to compensate for a low-frequency component of the radio-frequency signal;
   a control unit adapted to determine which of the high-frequency compensation unit or the low-frequency compensation unit is to be used to compensate for a frequency characteristic of the radio-frequency signal based on the determined disc format; and
   signal quality determining means for determining whether or not the quality of the radio-frequency signal is degraded,
   wherein the control unit compensates for the frequency characteristic of the radio-frequency signal using the high-frequency compensation unit or the low-frequency compensation unit in response to a degradation in the quality of the radio-frequency signal that is determined by the signal quality determining means.

2. The disc playback apparatus according to claim 1, wherein the disc format determining unit determines the format of the disc based on an intensity of the reflected light from the recording surface of the loaded disc.

3. The disc playback apparatus according to claim 1, wherein the disc playback apparatus is compatible with discs of multiple compact-disc formats, and
   the control unit determines that the high-frequency compensation unit is to be used to compensate for the frequency characteristic of the radio-frequency signal when a read only memory compact disc or a recordable compact disc is loaded in the disc playback apparatus, and determines that the low-frequency compensation unit is to be used to compensate for the frequency characteristic of the radio-frequency signal when a recordable erasable compact disc is loaded in the disc playback apparatus.

4. The disc playback apparatus according to claim 1, wherein the signal quality determining means counts C1 errors in the demodulated and decoded radio-frequency signal, and determines the quality of the radio-frequency signal based on the counted C1 errors.

5. A disc playback method for reproducing information by demodulating and decoding a radio-frequency signal obtained by receiving reflected light of a beam applied to a recording surface of a disc, the method comprising the steps of:
  determining the format of the disc;
  determining whether or not compensation for a frequency characteristic of the radio-frequency signal is necessary; and
  performing high-frequency compensation or low-frequency compensation on the radio-frequency signal depending on the format of the disc when the compensation is necessary,
  wherein the step of determining whether or not compensation for a frequency characteristic of the radio-frequency signal is necessary counts C1 errors in the demodulated and decoded radio-frequency signal, and determines whether or not the compensation is necessary based on the counted C1 error.

6. The disc playback method according to claim 5, wherein the step of determining the format determines the format of the disc based on an intensity of the reflected light from the recording surface of the disc.

7. The disc playback method according to claim 5, wherein the step of performing high-frequency compensation or low-frequency compensation performs high-frequency compensation when the disc is a read only memory compact disc or a recordable compact disc, and performs low-frequency compensation when the disc is a recordable erasable compact disc.

8. A disc playback apparatus for reproducing information by demodulating and decoding a radio-frequency signal obtained by receiving reflected light of a beam applied to a recording surface of a removable disc when the removable disc is loaded in the disc playback apparatus, the apparatus comprising:
  a disc format determining unit adapted to determine the format of the loaded disc;
  a high-frequency compensation unit adapted to compensate for a high-frequency component of the radio-frequency signal;
  a low-frequency compensation unit adapted to compensate for a low-frequency component of the radio-frequency signal; and
  a control unit adapted to determine which of the high-frequency compensation unit or the low-frequency compensation unit is to be used to compensate for a frequency characteristic of the radio-frequency signal based on the determined disc format,
  wherein the control unit determines whether or not the quality of the radio-frequency signal is degraded,
  wherein the control unit compensates for the frequency characteristic of the radio-frequency signal using the high-frequency compensation unit or the low-frequency compensation unit in response to a degradation in the quality of the radio-frequency signal that is determined by the signal quality determining means.

* * * * *